United States Patent [19]

Yashima et al.

[11] Patent Number: 5,554,688
[45] Date of Patent: Sep. 10, 1996

[54] THERMOPLASTIC RESIN COMPOSITION AND ITS SYNTHETIC RESIN COMPOSITE

[75] Inventors: Hiroyuki Yashima; Katsuji Horio, both of Ichihara, Japan

[73] Assignee: Denki Kagaku Kogyo Kabushiki Kaisha, Tokyo, Japan

[21] Appl. No.: 610,754

[22] Filed: Aug. 3, 1995

Related U.S. Application Data

[63] Continuation of Ser. No. 305,556, Sep. 14, 1994, abandoned.

[30] Foreign Application Priority Data

Sep. 28, 1993 [JP] Japan .................................. 5-241668
May 16, 1994 [JP] Japan .................................. 6-124698

[51] Int. Cl.$^6$ .......................... C08L 25/08; C08L 25/12; C08L 9/02; C08L 9/06
[52] U.S. Cl. .......................... 525/71; 525/80; 525/227; 525/238; 525/241; 428/462
[58] Field of Search .......................... 525/71, 241, 238, 525/227, 80; 428/462

[56] References Cited

U.S. PATENT DOCUMENTS

| | | | |
|---|---|---|---|
| 5,180,779 | 1/1993 | Kamoshita et al. | 525/87 |
| 5,229,457 | 7/1993 | Kamoshita et al. | 525/71 |
| 5,238,719 | 8/1993 | Kamoshita et al. | 428/36.92 |

FOREIGN PATENT DOCUMENTS

| | | |
|---|---|---|
| 2284906 | 11/1990 | Japan . |
| 5155949 | 6/1993 | Japan . |
| 5310862 | 11/1993 | Japan . |
| 5320273 | 12/1993 | Japan . |
| 5320274 | 12/1993 | Japan . |
| 5320461 | 12/1993 | Japan . |
| 5339465 | 12/1993 | Japan . |
| 61814 | 1/1994 | Japan . |
| 61815 | 1/1994 | Japan . |
| 649317 | 2/1994 | Japan . |
| 6172610 | 6/1994 | Japan . |
| 6221749 | 8/1994 | Japan . |

*Primary Examiner*—W. Robinson H. Clark
*Attorney, Agent, or Firm*—Oblon, Spivak, McClelland, Maier & Neustadt, P.C.

[57] ABSTRACT

A thermoplastic resin composition comprising (A) 100 parts by weight of a diene rubber-containing styrene resin, (B) from 1 to 50 parts by weight of a vinyl resin-containing acrylic rubber polymer obtained by polymerizing from 1 to 200 parts by weight of at least one vinyl monomer in the presence of 100 parts by weight of an acrylic rubber polymer, and (C) from 0 to 48 parts by weight of a polymer of a vinyl monomer having a weight average molecular weight of at least 200,000, provided that the sum of components (B) and (C) is from 1 to 60 parts by weight.

16 Claims, 1 Drawing Sheet

THERMOPLASTIC RESIN COMPOSITION AND ITS SYNTHETIC RESIN COMPOSITE

This application is a Continuation of application Ser. No. 08/305,556, filed on Sep. 14, 1994, now abandoned.

BACKGROUND OF THE INVENTION

1. Field of the Invention

The present invention relates to a thermoplastic resin composition excellent in Freon resistance and in mechanical properties, which comprises a diene rubber-containing styrene resin, a vinyl resin-containing acrylic rubber polymer obtained by polymerizing a vinyl monomer in the presence of an acrylic rubber polymer and a polymer of a vinyl monomer having a weight average molecular weight of at least 200,000, a process for producing such a thermoplastic resin composition, and a synthetic resin composite consisting essentially of a shaped product of the thermoplastic resin composition and a urethane foam.

2. Discussion of Background

Diene rubber-containing styrene resins represented by ABS resins have high impact resistance and excellent rigidity, mold-processability, gloss and appearance, and they are widely used for industrial parts and household electrical equipments. ABS resins have environmental stress-crack resistance against Freon 11 which is a blowing agent for a foamed hard urethane to be used for e.g. heat insulation between an outer box and an inner box of a household refrigerator.

Certain Freons such as Freon 11 presently used as blowing agents have been criticized as ozone layer-destroying factors, and termination of their production is planed from the viewpoint of protection of global environment. Under the circumstances, use of substitute Freons which are less likely to destroy the environment, is planed. However, substitute Freons such as Freon 141b (i.e. 1,1-dichloro-1-fluoroethane) and Freon 123 (i.e. 1,1-dichloro-2,2,2-trifluoroethane) which are expected to be used as blowing agents, have high penetration power into resins as compared with Freon 11. Accordingly, if an ABS resin is used for a synthetic resin composite produced by using such a substitute Freon as a blowing agent, cracking is highly likely to result.

Among ABS resins, a so-called high nitrile resin (Japanese Unexamined Patent Publication No. 228860/1987) is available which has a remarkably high acrylonitrile content and which is excellent in Freon resistance. However, a resin having a high acrylonitrile content has drawbacks such that the resin is yellowish and its molded product tends to be yellowish, and it is poor in the heat stability and in the vacuum forming property.

SUMMARY OF THE INVENTION

The present inventors have conducted extensive studies to improve the environmental stress-crack resistance of the diene rubber-containing styrene resin represented by an ABS resin itself, particularly to improve the substitute Freon resistance and to solve the above-mentioned problems relating to a synthetic resin composite consisting of a shaped product of such a resin and a urethane foam. As a result, they have found it possible to accomplish such objects with a thermoplastic resin composition comprising a diene rubber-containing styrene resin, a vinyl resin-containing acrylic rubber polymer obtained by polymerizing at least one vinyl monomer in the presence of an acrylic rubber polymer and a polymer of a vinyl monomer having a weight average molecular weight of at least 200,000.

That is, the present invention provides a thermoplastic resin composition comprising (A) 100 parts by weight of a diene rubber-containing styrene resin, (B) from 1 to 50 parts by weight of a vinyl resin-containing acrylic rubber polymer obtained by polymerizing from 1 to 200 parts by weight of at least one vinyl monomer in the presence of 100 parts by weight of an acrylic rubber polymer, and (C) from 0 to 48 parts by weight of a polymer of a vinyl monomer having a weight average molecular weight of at least 200,000, provided that the sum of components (B) and (C) is from 1 to 60 parts by weight.

Further, the present invention provides a synthetic resin composite consisting essentially of a shaped product of this thermoplastic resin composition and a urethane foam.

DETAILED DESCRIPTION OF THE PREFERRED EMBODIMENTS

Figure 1A:
FIG. 1(a) is a cross-sectional view of a shaped product of a thermoplastic resin composition.

The diene rubber-containing styrene resin of component (A) of the present invention is composed of a diene rubber component and a resin component. The diene rubber component may, for example, be a homopolymer of a conjugated diene monomer such as butadiene, isoprene, dimethylbutadiene, chloroprene or cyclopentadiene, or a non-conjugated diene monomer such as 2,5-norbornadiene, 4-ethylidenenorbornene or 1,4-cyclohexadiene, or a copolymer of such a conjugated diene monomer or a non-conjugated diene monomer with an aromatic vinyl monomer such as styrene, α-methylstyrene or vinyltoluene, a vinylcyanide monomer such as acrylonitrile or methacrylonitrile, an acrylic acid ester monomer such as methyl acrylate, ethyl acrylate, butyl acrylate, hexyl acrylate, 2-ethylhexyl acrylate or octyl acrylate, a methacrylic acid ester monomer such as methyl methacrylate, ethyl methacrylate, butyl methacrylate, hexyl methacrylate, 2-ethylhexyl methacrylate or octyl methacrylate, an olefin monomer such as ethylene, propylene, 1-butene, isobutylene or 2-butene, a maleimide monomer such as maleimide, N-methylmaleimide, N-ethylmaleimide or N-phenylmaleimide, an acid anhydride monomer such as maleic anhydride, a vinyl ether monomer such as methyl vinyl ether, ethyl vinyl ether, propyl vinyl ether, hexyl vinyl ether, octadecyl vinyl ether, phenyl vinyl ether or glycidyl vinyl ether, or a vinyl ketone monomer such as methyl vinyl ketone or phenyl vinyl ketone.

Further, the diene rubber component may be a copolymer having a polyfunctional vinyl monomer copolymerized as a crosslinking monomer. As such a polyfunctional vinyl monomer, divinylbenzene, ethylene glycol dimethacrylate, 1,3-butylene glycol dimethacrylate, propylene glycol dimethacrylate, triallyl cyanurate, triallyl isocyanurate, allyl acrylate, allyl methacrylate, vinyl acrylate, vinyl methacrylate, glycidyl acrylate or glycidyl methacrylate may, for example, be mentioned.

The diene rubber component to be used for component (A) is required to have graft active sites. Specifically, it is preferred that the rubber component contains carbon-carbon double bonds.

There is no particular restriction as to the method for polymerizing the above-mentioned monomer. A known method such as emulsion polymerization or solution polymerization may, for example, be employed. The diene rubber component for component (A) may not necessarily be made of a single kind, and it may be a mixture of two or more rubber components separately polymerized.

The diene rubber component in component (A) is usually from 1 to 40 wt %, preferably from 3 to 30 wt %. If it is less than 1 wt %, the impact strength tends to be inadequate, and if it exceeds 40 wt %, the rigidity tends to be inadequate.

As monomers constituting the resin component for the diene rubber-containing styrene resin of component (A) of the present invention, an aromatic vinyl monomer such as styrene, α-methylstyrene, vinyltoluene or t-butylstyrene, and a vinylcyanide monomer such as acrylonitrile or methacrylonitrile, are essential. The resin component may be made solely of these monomers, but these monomers may be copolymerized with one or more other monomers selected from the group consisting of acrylic acid ester monomers such as methyl acrylate, ethyl acrylate, butyl acrylate, hexyl acrylate, 2-ethylhexyl acrylate and octyl acrylate, methacrylic acid ester monomers such as methyl methacrylate, ethyl methacrylate, butyl methacrylate, hexyl methacrylate, 2-ethylhexyl methacrylate and octyl methacrylate, amide monomers such as acrylamide and methacrylamide, unsaturated carboxylic acid monomers such as acrylic acid, methacrylic acid and itaconic acid, olefin monomers such as ethylene, propylene, 1-butene, isobutylene and 2-butene, maleimide monomers such as maleimide, N-methylmaleimide, N-ethylmaleimide and N-phenylmaleimide, acid anhydride & monomers such as maleic anhydride, vinyl ether monomers such as methyl vinyl ether, ethyl vinyl ether, propyl vinyl ether, hexyl vinyl ether, octadecyl vinyl ether, phenyl vinyl ether and glycidyl vinyl ether, and vinyl ketone monomers such as methyl vinyl ketone and phenyl vinyl ketone.

As mentioned above, it is essential that the resin component for component (A) contains an aromatic vinyl monomer and a vinyl cyanide monomer. The vinyl cyanide monomer is preferably from 20 to 50 wt %, more preferably from 25 to 45 wt %. If the vinyl cyanide monomer is less than 20 wt %, the Freon resistance of the resulting synthetic resin composite tends to be inadequate, and if it exceeds 50 wt %, the thermoplastic resin composition tends to undergo yellowing due to the heat history during the mold-processing.

As mentioned above, component (A) to be used in the present invention, is composed of a diene rubber component and a resin component. It is necessary that a graft structure is present at the interface between the diene rubber component taking a particle structure and the resin component constituting a continuous phase. It is known that such a graft structure can be accomplished by a so-called graft polymerization method wherein part or whole of the monomer constituting the resin component, is polymerized in the presence of the diene rubber component. Component (A) of the present invention can be produced by such a conventional graft polymerization technique.

To adjust the content of the diene rubber component contained in component (A), it is possible to mix a resin component separately polymerized, to component (A). The resin component separately polymerized, may not necessarily have the same composition as the resin composition obtained by the graft polymerization. For example, to component (A) obtained by graft-polymerizing acrylonitrile and styrene in the presence of polybutadiene, an acrylonitrile-styrene copolymer may be mixed as the resin component, or an acrylonitrile-styrene-α-methylstyrene copolymer obtained by separately polymerizing acrylonitrile, styrene and α-methylstyrene, may be mixed. As mentioned above, the resin component in component (A) includes the polymer graft-polymerized in the presence of the diene rubber component, the polymer present in a not-graft polymerized form and the polymer mixed to adjust the content of the diene rubber component.

Specific examples of the diene rubber-containing styrene resin of component (A) to be used in the present invention, include an ABS (acrylonitrile-butadiene-styrene) resin, a heat resistant ABS (acrylonitrile-butadiene-α-methylstyrene) resin, an AES (acrylonitrile-EPDM-styrene) resin, and a MBAS (methyl methacrylate-butadiene-acrylonitrile-styrene resin.

Now, the vinyl resin-containing acrylic rubber polymer of component (B) to be used in the present invention, will be described.

The acrylic rubber polymer in component (B) to be used in the present invention, may, for example, be a homopolymer or copolymer of an acrylic acid ester monomer such as methyl acrylate, ethyl acrylate, butyl acrylate, hexyl acrylate, 2-ethylhexyl acrylate, cyclohexyl acrylate, octyl acrylate, dodecyl acrylate, stearyl acrylate, 2-ethoxyethyl acrylate or 2-hydroxyethyl acrylate, a homopolymer or copolymer of a methacrylic acid ester monomer such as hexyl methacrylate, 2-hexyl methacrylate, octyl methacrylate, hexadecyl methacrylate, dodecyl methacrylate, decyl methacrylate, octadecyl methacrylate, stearyl methacrylate or pentyl methacrylate, or a rubber polymer obtained by copolymerizing an acrylic acid ester monomer with at least one methacrylic acid ester monomer selected from the group consisting of methyl methacrylate, ethyl methacrylate, propyl methacrylate, butyl methacrylate, cyclohexyl methacrylate, hydroxy methacrylate and the above-mentioned methacrylic acid ester monomers.

The acrylic rubber polymer in component (B) may be the one wherein a polyfunctional vinyl monomer is used at the time of polymerization of the acrylic rubber polymer. As the polyfunctional vinyl monomer, ethylene glycol dimethacrylate, polyethylene glycol dimethacrylate, propylene glycol dimethacrylate, glycidyl methacrylate, divinylbenzene, allyl acrylate, allyl methacrylate, vinyl acrylate or vinyl methacrylate may, for example, be mentioned. When polyfunctional vinyl monomer units are present in the acrylic rubber polymer, they constitute graft active sites during the polymerization of the vinyl monomer, thus leading to partial graft polymerization. The polyfunctional vinyl monomer units are preferably at most 8 wt % (inclusive of 0%). If they exceed 8 wt %, the Freon resistance of the thermoplastic resin composition tends to be low, such being undesirable.

The above-mentioned acrylic rubber polymer is required to have a glass transition temperature of not higher than 20° C., preferably not higher than 10° C. If the glass transition temperature exceeds 20° C., the Freon resistance and the impact resistance of the thermoplastic resin composition tend to be poor.

Further, the gel content of the acrylic rubber polymer is required to be not higher than 70%, preferably not higher than 50%. If the gel content of the acrylic rubber polymer exceeds 70%, the Freon resistance of the thermoplastic resin composition tends to be substantially poor, such being undesirable.

The gel content in the present invention is determined in such a manner that about 1.0 g of the acrylic rubber polymer is accurately weighed ($S_0$ g), put into a cage made of a stainless steel net of 400 mesh, immersed in 100 g of toluene and left to stand at 5° C. for 24 hours, and then the cage is withdrawn and dried at room temperature, whereupon the weight ($S_1$ g) of the insoluble content is measured, whereupon the gel content is calculated in accordance with the following formula (I):

$$(S_1/S_0) \times 100(\%) \tag{I}$$

Component (B) of the present invention is obtained by polymerizing a vinyl monomer in the presence of the above described acrylic rubber polymer. Specifically, the vinyl monomer may, for example, be an aromatic vinyl monomer such as α-methylstyrene, vinyltoluene or t-butylstyrene, a vinylcyanide monomer such as acrylonitrile or methacrylonitrile, a methacrylic acid ester monomer such as methyl methacrylate, ethyl methacrylate, butyl methacrylate, hexyl methacrylate, 2-ethylhexyl methacrylate, octyl methacrylate, dodecyl methacrylate or stearyl methacrylate, or an acrylic acid ester monomer such as methyl acrylate, ethyl acrylate, butyl acrylate, hexyl acrylate, 2-ethylhexyl acrylate, octyl acrylate, dodecyl acrylate, stearyl acrylate, 2-ethoxyethyl acrylate, 2-ethoxyethyl acrylate or 2-hydroxyethyl acrylate. However, the vinyl monomer is not limited to such specific examples.

The glass transition temperature of the vinyl resin component in the vinyl resin-containing acrylic rubber polymer for component (B) preferably exceeds 20° C.

There is no particular restriction as to the polymerization method for producing the acrylic rubber polymer or the vinyl resin-containing acrylic rubber polymer. A conventional method such as emulsion polymerization, suspension polymerization, solution polymerization or bulk polymerization may be employed. However, production by emulsion polymerization is most advantageous from the industrial point of view, because, in the present invention, for the production of the thermoplastic resin composition comprising components (A), (B) and (C), it is preferred to mix component (A) to a polymer mixture obtained by mixing an emulsion of the polymer of component (B) and an emulsion of the polymer of component (C).

Component (B) of the present invention can be obtained by polymerizing from 1 to 200 parts by weight, preferably from 50 to 160 parts by weight, of the vinyl monomer in the presence of 100 parts by weight of the acrylic rubber polymer having the above-mentioned glass transition temperature and gel content. If the vinyl monomer exceeds 200 parts by weight, the Freon resistance of the thermoplastic resin composition tends to be poor, and if it is less than 1 part by weight, the compatibility of component (B) to component (A) tends to be inadequate.

Now, the polymer of a vinyl monomer of component (C) of the present invention will b described.

The vinyl monomer constituting component(C) of the present invention may, for example, be an aromatic vinyl monomer such as styrene, α-methylstyrene, vinyltoluene or t-butylstyrene, a vinylcyanide monomer such as acrylonitrile or methacrylonitrile, a methacrylic acid ester monomer such as methyl methacrylate, ethyl methacrylate, butyl methacrylate, hexyl methacrylate, 2-ethylhexyl methacrylate, octyl methacrylate, dodecyl methacrylate or stearyl methacrylate, an acrylic acid ester monomer such as methyl acrylate, ethyl acrylate, butyl acrylate, hexyl acrylate, 2-ethylhexyl acrylate, octyl acrylate, dodecyl acrylate, stearyl acrylate, 2-ethoxyethyl acrylate, or 2-hydroxyethyl acrylate, an amide monomer such as acrylamide or methacrylamide, an unsaturated carboxylic acid monomer such as acrylic acid, methacrylic acid or itaconic acid, an olefin monomer such as ethylene, propylene, 1-butene, isobutylene or 2-butene, a maleimide monomer such as maleimide, N-methylmaleimide, N-ethylmaleimide or N-phenylmaleimide, an acid anhydride monomer such as maleic anhydride, a vinyl ether monomer such as methyl vinyl ether, ethyl vinyl ether, propyl vinyl ether, hexyl vinyl ether, octadecyl vinyl ether, phenyl vinyl ether or glycidyl vinyl ether, or a vinyl ketone monomer such as methyl vinyl ketone or phenyl vinyl ketone. However, the vinyl monomer is not limited to such specific examples.

Component (C) is required to have a glass transition temperature exceeding 20° C. The glass transition temperature is preferably at least 30° C. If the glass transition temperature is lower than 20° C., the heat resistance of the thermoplastic resin composition tends to be low, such being undesirable.

Component (C) of the present invention is required to have a weight average molecular weight of at least 200,000, as measured by gel permeation chromatography (GPC) using a standard polystyrene as a calibration curve. The weight average molecular weight is preferably at least 300,000. If the weight average molecular weight is less than 200,000, the wall thickness of the thermoplastic resin composition tends to be non-uniform at the time of vacuum forming.

There is no particular restriction as to the method for producing the polymer of component (C) of the present invention. A conventional method such as emulsion polymerization, suspension polymerization, solution polymerization or bulk polymerization may be used. However, production by emulsion polymerization is most advantageous from the industrial point of view, because such is most advantageous to mix the emulsions of components (B) and (C) in the present invention, and a polymer of a high molecular weight can readily be produced by emulsion polymerization.

Selection of the vinyl monomer for the production of the polymer of component (C) of the present invention is optional so long as the resulting polymer of component (C) satisfies the requirements of the present invention for the glass transition temperature and the weight average molecular weight.

It is possible to use a chain transfer agent for the purpose of controlling the molecular weight of the polymer of component (C). There is no particular restriction as to the chain transfer agent to be used. For example, octylmercaptan, decylmercaptan, dodecylmercaptan, thioglycolic acid, ethyl thioglycolate, ethyl o-mercaptobenzoate, a halogen compound such as carbon tetrachloride, a hydrocarbon such as limonene or terpinolene, a nitro compound such as trinitrobenzene, or benzoquinone, may be mentioned.

In the present invention, the thermoplastic resin composition is produced by mixing so that it comprises 100 parts by weight of component (A), from 1 to 50 parts by weight of component (B) and from 0 to 48 parts by weight of component (C), provided that the sum of components (B) and (C) is from 1 to 60 parts by weight. Preferably, it comprises 100 parts by weight of component (A), from 1.5 to 35 parts by weight of component (B) and from 1.8 to 37.5 parts by weight of component (C), provided that the sum of components (B) and (C) is from 6 to 50 parts by weight. If the amount of component (B) is less than 1 part by weight per 100 parts by weight of component (A), the Freon resistance of the thermoplastic resin composition tends to be inadequate. On the other hand, if the amount of component (B) exceeds 50 parts by weight, the mechanical properties of the thermoplastic resin composition tend to deteriorate. If the sum of components (B) and (C) exceeds 60 parts by weight, peeling of the thermoplastic resin composition is likely to occur.

The thermoplastic resin composition of the present invention can be obtained by melt-mixing components (A), (B) and (C). The melt-mixing method is not particularly limited. For example, a conventional melt-mixing method may be employed wherein they are mixed by e.g. a Henschel mixer or a tumbler, followed by melt-mixing with a screw extruder, a Brabender, a Banbury mixer, a co-kneader or a mixing roll.

As a method with a preferred order of mixing components (A), (B) and (C), a method may be mentioned wherein an emulsion of the polymer of component (B) and an emulsion of the polymer of component (C) are mixed and then the polymer mixture obtained by separation from the mixture, is mixed with component (A).

In such a case, from 20 to 85 wt % (as solid content of the polymer) of the emulsion of the polymer of component (B) and from 15 to 80 wt % (as solid content of the polymer) of the emulsion of the polymer of component (C) are mixed in the respective emulsion states, followed by separation to obtain a polymer mixture, which is then mixed with component (A) in accordance with the above-mentioned mixing method, under the conditions which satisfy that the composition comprises 100 parts by weight of component (A), from 1 to 50 parts by weight of component (B) and from 0 to 48 parts by weight of component (C), provided that the sum of components (B) and (C) is from 1 to 60 parts by weight. Preferably, the emulsion of the polymer of component (B) is from 25 to 70 wt %, and the emulsion of the polymer of component (C) is from 30 to 75 wt %, as solid contents of the respective polymers. If the emulsion of the polymer of component (B) is less than 20 wt %, the Freon resistance of the thermoplastic resin composition tends to be poor, and if it exceeds 85 wt %, the shaped product of the thermoplastic resin composition tends to undergo a cleavage phenomenon.

In the present invention, the emulsion of the polymer of component (B) and the emulsion of the polymer of component (C) are preferably mixed. When component (B) or component (C) is produced by emulsion polymerization, the emulsion obtained by the emulsion polymerization can be used as it is. However, when it is produced by other polymerization method, a step of emulsifying the obtained polymer will be required.

The method for emulsifying the polymer is not particularly limited, and a conventional method may optionally be used. For example, it is possible to employ a method wherein a polymer solution is mixed and stirred together with an emulsifier and water to obtain an emulsion, followed by removal of the solvent, a method wherein fine powder obtained by pulverizing a polymer is mixed and stirred together with an emulsifier and water to obtain an emulsion, or a method wherein the polymer is pulverized in the presence of an emulsifier and water to obtain an emulsion. However, the method is not limited to such specific examples.

The type of the emulsifier to be used for emulsifying the polymer or the emulsified polymer of component (B) or (C), is not particularly limited, and it may be optionally selected from the group consisting of an anion surfactant, a cation surfactant, an amphoteric surfactant and a non-ionic surfactant. However, an anionic surfactant can most advantageously be used.

There is no particular restriction as to the method of mixing the above-mentioned emulsions, and mixing can be carried out by means of an apparatus such as a fixed container type mixing apparatus, a rotary container type mixing apparatus, a pipeline mixer or a static mixer.

There is no particular restriction as to the method of separating the polymer mixture comprising components (B) and (C) from the mixture of the emulsions. It may, for example, be a method wherein a precipitating agent, for example, an acid such as hydrochloric acid, sulfuric acid, phosphoric acid or acetic acid, an electrolyte such as sodium chloride, calcium chloride, aluminum chloride, sodium sulfate or magnesium sulfate, or a water-soluble polymer such as polyvinyl alcohol, polyethylene glycol, a polyethylene glycol-polypropylene glycol block copolymer or a carboxymethylcellulose, is added to the mixture of emulsions, or a method wherein the mixture of emulsions is freezed for demulsification, or a method wherein the mixture of emulsions is sprayed in a high temperature gas.

The polymer mixture separated from the mixture of the emulsions of polymers of components (B) and (C), may further be supplied to a melt-kneading apparatus for melt-kneading. As a useful melt-kneading apparatus, a Banbury mixer, an intensive mixer, a co-kneader, an extruder or a roll mill may, for example, be mentioned.

Further, a melt-mixing apparatus equipped with a dehydrating mechanism can also be used. In such a case, the mixture of emulsions and the precipitating agent may continuously be supplied to the apparatus, whereby mixing, demulsification, dehydration, drying and melt-mixing can continuously be conducted in the same apparatus.

To the thermoplastic resin composition of the present invention, other thermoplastic resins, a dispersant, a lubricant, an antioxidant, a fungicide, a pigment, etc. may be incorporated, as the case requires.

The thermoplastic resin composition of the present invention has excellent properties i.e. well balanced Freon resistance, impact resistance and vacuum-forming property, and it is useful for a synthetic resin composite.

Now, a synthetic resin composite consisting essentially of a shaped product of the thermoplastic resin composition of the present invention and a urethane foam, will be described.

The synthetic resin composite of the present invention is produced by reacting a mixture comprising a polyisocyanate, a polyol and a blowing agent, as the main components, in the presence of a shaped product preliminarily formed by means of the thermoplastic resin composition. There is no particular restriction as to the composition or the process for the production of the urethane foam of the present invention.

Specific examples of the polyisocyanate to be used for the production of the urethane foam, include tolylene diisocyanate, o-tolylene diisocyanate, diphenylmethane- 4,4-diisocyanate, 1,3-xylylene diisocyanate, naphthylene-1,5-diisocyanate, and 1-methylcyclohexane-2,4-diisocyanate.

Specific examples of the polyol include 1,4 -butanediol, ethylene glycol, polyethylene glycol, propylene glycol, polypropylene glycol, a poly(ethyleneoxide-propyleneoxide) copolymer, diols such as α,ω-polycaprolactonediol and α,ω-polybutadienediol, triols such as glycerol and trimethylolpropane, pantaerythritol, methylglycoxide, sorbitol, and sucrose. Further, ethylene oxide or propylene oxide, or an adduct thereof with a polyol, may be mentioned.

The blowing agent may, for example, be Freon 11, Freon 12, Freon 113, Freon 123, Freon 141b or methylene chloride.

For the production of urethane foams, it is known to use water functioning as a chemical blowing agent, a catalyst represented by an organotin compound or a tertiary amine, or a surfactant functioning as a foam stabilizer, and many references are available which disclose methods of their use. In the present invention, there is no particular restriction as to the method for foaming urethane.

Now, the present invention will be described in further detail with reference to Examples and Comparative Examples. However, it should be understood that the present invention is by no means restricted by such specific Examples. In the Examples, "parts" and "%" mean "parts by weight" and "% by weight", respectively.

Firstly, the thermoplastic resin composition will be described.

(1) With respect to component (A)

The ABS resin powder and the AS resin as identified in Table 1 were mixed in the proportions as identified in Table 1 to obtain A-1 to A-4 as component (A). The weight average molecular weight of each AS resin used for component (A) was less than 200,000, as measured by GPC.

(2) With respect to component (B) Experiment 1: Preparation of component (B)

(a) Acrylic rubber polymer

120 Parts of pure water and 2 parts of sodium dodecylbenzene sulfonate were charged into an autoclave and heated to 65° C. with stirring. Added thereto was an aqueous solution having 0.005 part of ferric sulfate heptahydrate, 0.01 part of tetrasodium ethylenediamine tetraacetate dihydrate and 0.3 part of sodium formaldehyde sulfoxylate dihydrate dissolved in 10 parts of pure water.

Then, 20% of 100 parts of a monomer mixture having the composition as identified in Table 2, was added to the autoclave, and 2.5 parts of an aqueous solution containing 0.2% of potassium persulfate, was added to initiate the polymerization. Simultaneously with the initiation of polymerization, the rest of the monomer mixture was continuously added thereto over a period of 4 hours. Further, simultaneously with the initiation of polymerization, an aqueous solution having 0.05 part of potassium persulfate dissolved in 20 parts of pure water, was continuously added thereto over a period of 6 hours. After completion of the addition of the potassium persulfate solution, the content of the autoclave was cooled to terminate the polymerization, to obtain a-1 to a-6. The properties of the obtained acrylic rubber polymers are also shown in Table 2.

(b) Vinyl resin-containing acrylic rubber polymer

100 Parts (as solid content of polymer) of the acrylic rubber polymer latex as identified in Table 2, 2 parts of potassium stearate and 50 parts of pure water were charged into an autoclave and heated to 50° C. with stirring. Added thereto was an aqueous solution having 0.005 part of ferric sulfate heptahydrate, 0.01 part of tetrasodium ethylenediamine tetraacetate dihydrate and 0.3 part of sodium formaldehyde sulfoxylate dihydrate dissolved in 10 parts of pure water.

Then, a mixture having 0.1 part of tert-butyl peracetate dissolved in 100 parts of the mixture of vinyl monomers as identified in Table 3, was continuously added over a period of 5 hours. After completion of the addition of the mixture of monomers, 0.1 part of tertbutyl peracetate was added thereto, and the mixture was heated to 70° C. and further stirred for 2 hours to complete the polymerization, to obtain B-1 to B-8. The proportions of the acrylic rubber polymer and vinyl monomer mixture in the obtained vinyl resin-containing acrylic rubber polymer, are show in Table 4.

(3) With respect to component (C) Experiment 2: Preparation of component (C)

150 Parts of pure water and 2 parts of potassium stearate were charged into an autoclave and heated to 50° C. with stirring. Added thereto was an aqueous solution having 0.005 part of ferric sulfate heptahydrate, 0.01 part of tetrasodium ethylenediamine tetraacetate dihydrate and 0.3 part of sodium formaldehyde sulfoxylate dihydrate dissolved in 10 parts of pure water.

Then, 100 parts of the mixture of vinyl monomers having the composition as identified in Table 5 and 0.08 part of t-dodecyl mercaptan were continuously added thereto over a period of 4 hours. At the same time, an aqueous solution having 0.05 part of potassium persulfate dissolved in 25 parts of water, was continuously added thereto over a period of 6 hours. After completion of the addition of the monomer mixture, 0.1 part of diisopropylbenzene hydroperoxide was added thereto. The system was heated to 70° C. and further stirred for 2 hours to complete the polymerization, to obtain C-1 to C-2. C-3 was prepared in the same manner under the same polymerization conditions as for C-1 and C-2 except that the composition of the mixture of the vinyl monomers was as identified in Table 5, and the amount of t-dodecyl mercaptan was changed to 0.3 part. The weight average molecular weights and the glass transition temperatures of the obtained vinyl polymers are also shown in Table 5.

(4) Polymer mixture prepared from a mixture of emulsions of components (B) and (C) Experiment 3: Preparation of polymer mixture (D) obtained by mixing emulsions of components (B) and (C)

An emulsion of the polymer of component (B) and an emulsion of the polymer of component (C) were mixed in the proportions (as solid contents of the polymers) as identified in Table 6. An aqueous solution having 5 parts of calcium chloride dihydrate dissolved in 400 parts of pure water, was heated to a temperature of from 80° to 95° C., and the above mixture of emulsions was poured thereinto with stirring for precipitation. The obtained slurry was subjected to filtration, washing with water and drying in an atmosphere of 70° C., to obtain a polymer mixture (D-1 to D-16) as identified in Table 6.

(5) Preparation of the thermoplastic resin composition

EXAMPLE 1

100 Parts of A-1 as component (A) prepared by mixing the ABS resin powder comprising 50% of polybutadiene, 15% of acrylonitrile and 35% of styrene and the AS resin comprising 70% of acrylonitrile and 30% of styrene, in the proportions as identified in Table 1, and 5 parts of D-2 as polymer mixture (D) obtained from the mixture of emulsions as identified in Table 6, were mixed and melt-kneaded at 230° C. by a twin screw extruder to obtain a thermoplastic resin composition. Using the obtained thermoplastic resin composition, test samples were prepared by an injection molding machine, and the physical properties were measured. The results are shown also in Table 7.

EXAMPLES 2 to 19

100 Parts of component (A) having the composition as identified in Table 1, and polymer mixture (D) as identified in Table 6, were mixed in the proportions as identified in Table 7 or 8 and melt-kneaded at 230° C. by a twin screw extruder to obtain a thermoplastic resin composition. Using the obtained thermoplastic resin composition, test samples were prepared by an injection molding machine, and the physical properties were measured. The results are shown also in Table 7 or 8.

EXAMPLE 20

A mixture comprising 100 parts of A-1 as component (A), 9 parts of B-2 as component (B) and 6 parts of C-1 as component (C), was melt-mixed at 230° C. by a twin screw extruder to obtain a thermoplastic resin composition. Using this thermoplastic resin composition, test samples were prepared by an injection molding machine, and the physical properties were measured. The results are shown in Table 9.

EXAMPLE 21

A mixture comprising 100 parts of A-3 as component (A), 9 parts of B-2 as component (B) and 6 parts of C-1 as component (C), was melt-mixed at 230° C. by a twin screw extruder to obtain a thermoplastic resin composition. Using this thermoplastic resin composition, test samples were prepared by an injection molding machine, and the physical properties were measured. The results are shown in Table 9.

COMPARATIVE EXAMPLES 1 to 8

100 Parts of component (A) having the composition as identified in Table 1 and polymer mixture (D) as identified in Table 6 were mixed in the proportions as identified in Table 10 and melt-kneaded at 230° C. by a twin screw extruder to obtain a thermoplastic resin composition. Using the obtained thermoplastic resin composition, test samples were prepared by an injection molding machine, and the physical properties were measured. The results are shown also in Table 10.

The physical properties in Examples and Comparative Examples were measured by the following methods.
(1) Glass transition temperature A solid obtained by dropping an emulsion of component (B) or (C) into methanol, was dried, and the glass transition temperature was measured by 910 differential scanning calorimeter and 990 thermal analyzer, which are Du Pont type measuring apparatus.
(2) Weight average molecular weight The measurement was conducted by connecting two GMH-6 Model columns, manufactured by TOSOH CORPORATION, in series to HLC-802A Model gel permeation chromatography, manufactured by TOSOH CORPORATION. As the detector, a refractometer was used, and as the solvent, tetrahydrofuran was used.

As the test sample, a solid obtained by precipitating an emulsion of the polymer of component (C) into methanol, was used.
(3) Gel content A solid obtained by dropping an emulsion of the polymer of component (B) or (C) into methanol, was dried. About 1.0 g thereof was accurately weighed, followed by the procedure as described in the foregoing to calculate the gel content. However, the solvent used was different between the polymer of component (B) and the polymer of component (C). Namely, methyl ethyl ketone was used for component (B), and toluene was used for component (C). (4) Izod impact strength: In accordance with ASTM D-256, the Izod impact strength was measured using a notched test specimen having a thickness of ¼ inch. (5) Melt flow rate: In accordance with JIS K-6874, the melt flow rate was measured at a temperature of 220° C. under a load of 10 kgf. (6) Freon resistance: The Freon resistance was evaluated in accordance with a ¼ ellipse method of Bergen. Namely, a test sample of 200× 200×2 mm was prepared by press molding at 230° C. Then, it was fixed to a ¼ ellipse jig and left to stand for 24 hours in an atmosphere of Freon 141$b$, whereupon the minimum strain (critical strain) for cracking was determined. (7) Lamellar peeling: A flat plate of 50 mm×100 mm×2 mm was molded by Toshiba IS50EP injection molding machine at a molding temperature of 230° C. at an injection speed of 70% at a mold temperature of 50° C. The gate portion of the molded product was broken by fingers, and the peeling at the broken surface was visually evaluated under the following evaluation standards:

○: No peeling was observed at the surface layer in the vicinity of the gate of the flat plate Δ: Slight peeling was observed at the surface layer ×: Peeling was distinctly observed at the surface layer

TABLE 1

Proportions of the monomers and the rubber polymers for component (A)

| | ABS resin | | | | AS resin | | | Composition of component (A) (wt %) | | | Amount of AN in the continous phase (wt %) |
|---|---|---|---|---|---|---|---|---|---|---|---|
| | ABS resin powder (wt %) | | | Amount | AS resin (wt %) | | Amount | | | | |
| | SM | AN | PBd | (parts) | SM | AN | (parts) | SM | AN | PBd | |
| A-1 | 35 | 15 | 50 | 30 | 70 | 30 | 70 | 59.5 | 25.5 | 15.0 | 30 |
| A-2 | 35 | 15 | 50 | 30 | 75 | 25 | 70 | 63.0 | 22.0 | 15.0 | 25 |
| A-3 | 30 | 20 | 50 | 30 | 60 | 40 | 70 | 51.0 | 34.0 | 15.0 | 40 |
| A-4 | 35 | 15 | 50 | 40 | 70 | 30 | 60 | 56.0 | 24.0 | 20.0 | 30 |

TABLE 2

Proportions of the monomers for an acrylic rubber polymer constituting component (B) and the physical properties

|  | n-BA (parts) | iso-BA (parts) | EA (parts) | MMA (parts) | EDMA (parts) | Glass transition temp (°C.) | Gel content (%) |
|---|---|---|---|---|---|---|---|
| a-1 | 100 | 0 | 0 | 0 | 0 | −53 | 0.1 |
| a-2 | 0 | 80 | 19.5 | 0 | 0.5 | −42 | 1.0 |
| a-3 | 90 | 0 | 0 | 10 | 0 | −45 | 0.2 |
| a-4 | 80 | 0 | 0 | 20 | 0 | −35 | 0.1 |
| a-5 | 100 | 0 | 0 | 0 | 10 | −49 | 82.0 |
| a-6 | 0 | 0 | 60 | 40 | 0.5 | 26 | 0.9 |

TABLE 3

Mixture of vinyl monomers

|  | SM (parts) | AN (parts) |
|---|---|---|
| b-1 | 70 | 30 |
| b-2 | 75 | 25 |

TABLE 4

Vinyl resin-containing acrylic rubber polymer

|  | Acrylic rubber polymer (parts) |  | Vinyl monomer mixture (parts) |  |
|---|---|---|---|---|
| B-1 | a-1 | 100 | b-1 | 50 |
| B-2 | a-1 | 100 | b-1 | 100 |
| B-3 | a-2 | 100 | b-2 | 150 |
| B-4 | a-3 | 100 | b-1 | 120 |
| B-5 | a-4 | 100 | b-1 | 200 |
| B-6 | a-2 | 100 | b-2 | 300 |
| B-7 | a-5 | 100 | b-1 | 100 |
| B-8 | a-6 | 100 | b-2 | 120 |

TABLE 5

Proportions of the monomers in component (C) and the physical properties

| Component (C) | SM (parts) | AN (parts) | MMA (parts) | Weight average molecular weight | Glass transition temp (°C.) |
|---|---|---|---|---|---|
| C-1 | 70 | 30 | 0 | 400,000 | 106 |
| C-2 | 60 | 30 | 10 | 370,000 | 102 |
| C-3 | 70 | 30 | 0 | 100,000 | 106 |

TABLE 6

Composition of polymer mixture (D)

|  | Proportions in polymer mixture (D) | | | |
|---|---|---|---|---|
|  | Component (B) | (wt%) | Component (C) | (wt%) |
| D-1 | B-2 | 80 | C-1 | 20 |
| D-2 | B-2 | 60 | C-1 | 40 |
| D-3 | B-2 | 40 | C-1 | 60 |
| D-4 | B-2 | 20 | C-1 | 80 |
| D-5 | B-1 | 60 | C-1 | 40 |
| D-6 | B-3 | 60 | C-1 | 40 |
| D-7 | B-4 | 60 | C-1 | 40 |
| D-8 | B-5 | 60 | C-1 | 40 |
| D-9 | B-2 | 60 | C-2 | 40 |
| D-10 | B-2 | 60 | C-3 | 40 |
| D-11 | B-2 | 100 | — | 0 |
| D-12 | — | 0 | C-1 | 100 |
| D-13 | B-7 | 100 | — | 0 |
| D-14 | B-6 | 60 | C-1 | 40 |
| D-15 | B-7 | 60 | C-1 | 40 |
| D-16 | B-8 | 60 | C-1 | 40 |

TABLE 7

Composition and physical properties of the thermoplastic resin composition

|  | Component (A) | (wt %) | Polymer Mixture (D) | (wt %) | Izod impact strength (kg cm/cm) | MFR (g/10 m · min) | Freon resistance (critical strain) | Lamellar peeling |
|---|---|---|---|---|---|---|---|---|
| Example 1 | A-1 | 100 | D-2 | 5 | 25 | 9.5 | 0.9 | o |
| Example 2 | A-1 | 100 | D-2 | 15 | 32 | 5.0 | >1.1 | o |
| Example 3 | A-1 | 100 | D-2 | 30 | 35 | 3.9 | >1.1 | o |
| Example 4 | A-1 | 100 | D-2 | 45 | 42 | 3.0 | >1.1 | o |
| Example 5 | A-1 | 100 | D-2 | 15 | 33 | 4.7 | >1.1 | o |
| Example 6 | A-2 | 100 | D-2 | 15 | 30 | 5.0 | >1.1 | o |

TABLE 7-continued

Composition and physical properties of the thermoplastic resin composition

|  | Component (A) (wt %) | | Polymer Mixture (D) (wt %) | | Izod impact strength (kg cm/cm) | MFR (g/10 m · min) | Freon resistance (critical strain) | Lamellar peeling |
|---|---|---|---|---|---|---|---|---|
| Example 7 | A-3 | 100 | D-2 | 15 | 32 | 4.5 | >1.1 | o |
| Example 8 | A-4 | 100 | D-2 | 15 | 36 | 3.2 | >1.1 | o |
| Example 9 | A-1 | 100 | D-3 | 15 | 32 | 4.6 | >1.1 | o |

TABLE 8

Composition and physical properties of the thermoplastic resin composition

|  | Component (A) (wt %) | | Polymer mixture (D) (wt %) | | Izod impact strength (kg cm/cm) | MFR (g/10 m · min) | Freon resistance (critical strain) | Lamellar peeling |
|---|---|---|---|---|---|---|---|---|
| Example 10 | A-1 | 100 | D-4 | 15 | 29 | 4.1 | >1.1 | o |
| Example 11 | A-1 | 100 | D-5 | 15 | 29 | 4.3 | >1.1 | o |
| Example 12 | A-1 | 100 | D-6 | 15 | 30 | 5.4 | >1.1 | o |
| Example 13 | A-1 | 100 | D-7 | 15 | 31 | 5.3 | >1.1 | o |
| Example 14 | A-1 | 100 | D-8 | 15 | 30 | 5.5 | >1.1 | o |
| Example 15 | A-1 | 100 | D-9 | 15 | 30 | 5.2 | >1.1 | o |
| Example 16 | A-1 | 100 | D-10 | 15 | 30 | 7.2 | >1.1 | Δ |
| Example 17 | A-1 | 100 | D-11 | 15 | 30 | 2.9 | >1.1 | Δ |
| Example 18 | A-1 | 100 | D-1 | 45 | 45 | 3.0 | >1.1 | o |
| Example 19 | A-1 | 100 | D-4 | 45 | 40 | 3.2 | >1.1 | o |

TABLE 9

Composition and physical properties of the thermoplastic resin composition

|  | Component (A) (wt %) | | Component (B) (wt %) | | Component (C) (wt %) | | Izod impact strength (kg cm/cm) | MFR (g/10 m · min) | Freon resistance (critical strain) | Lamellar peeling |
|---|---|---|---|---|---|---|---|---|---|---|
| Example 20 | A-3 | 100 | B-2 | 9 | C-1 | 6 | 30 | 5.2 | >1.1 | o |
| Example 21 | A-3 | 100 | B-2 | 9 | C-1 | 6 | 30 | 4.8 | >1.1 | o |

TABLE 10

Composition and physical properties of the thermoplastic resin composition

|  | Component (A) (wt %) | | Polymer mixture (D) (wt %) | | Izod impact strength (kg cm/cm) | MFR (g/10 m · min) | Freon resistance (critical strain) | Lamellar peeling |
|---|---|---|---|---|---|---|---|---|
| Comparative Example 1 | A-1 | 100 |  | 0 | 20 | 14.0 | 0.2 | o |
| Comparative Example 2 | A-1 | 100 | D-12 | 15 | 31 | 3.2 | 0.2 | o |
| Comparative Example 3 | A-1 | 100 | D-13 | 15 | 27 | 2.0 | 0.3 | x |
| Comparative Example 4 | A-1 | 100 | D-14 | 15 | 22 | 4.2 | 0.4 | o |
| Comparative Example 5 | A-1 | 100 | D-15 | 15 | 20 | 5.2 | 0.3 | x |
| Comparative | A-1 | 100 | D-16 | 15 | 18 | 4.8 | 0.2 | o |

TABLE 10-continued

Composition and physical properties of the thermoplastic resin composition

|  | Component (A) (wt %) |  | Polymer mixture (D) (wt %) |  | Izod impact strength (kg cm/cm) | MFR (g/10 m · min) | Freon resistance (critical strain) | Lamellar peeling |
| --- | --- | --- | --- | --- | --- | --- | --- | --- |
| Example 6 Comparative Example 7 | A-1 | 100 | D-2 | 65 | 47 | 1.2 | >1.1 | x |
| Comparative Example 8 | A-3 | 100 | D-14 | 15 | 22 | 4.8 | 0.4 | x |

In the Tables, the symbols for monomers have the following meanings.

SM represents styrene, AN acrylonitrile, PBd polybutadiene, n-BA n-butylacrylate, iso-BA iso-butylacrylate, EA ethyl acrylate, MMA methyl methacrylate and EDMA ethylene glycol dimethacrylate.

Now, the synthetic resin composite consisting essentially of a shaped product of the thermoplastic resin composition and a urethane foam, will be described.

EXAMPLE 22

5 Parts of polymer mixture D-2 obtained by mixing an emulsion of acrylic rubber polymer B-2 prepared by polymerizing a monomer having the composition of b-1 as identified in Table 3, in the presence of an acryl rubber latex of a-1 as identified in Table 2, and an emulsion of C-1, in the emulsified state, and 100 parts of A-1, were mixed and melt-kneaded at 230° C. by a twin screw extruder to obtain a thermoplastic resin composition.

Figure 1B:
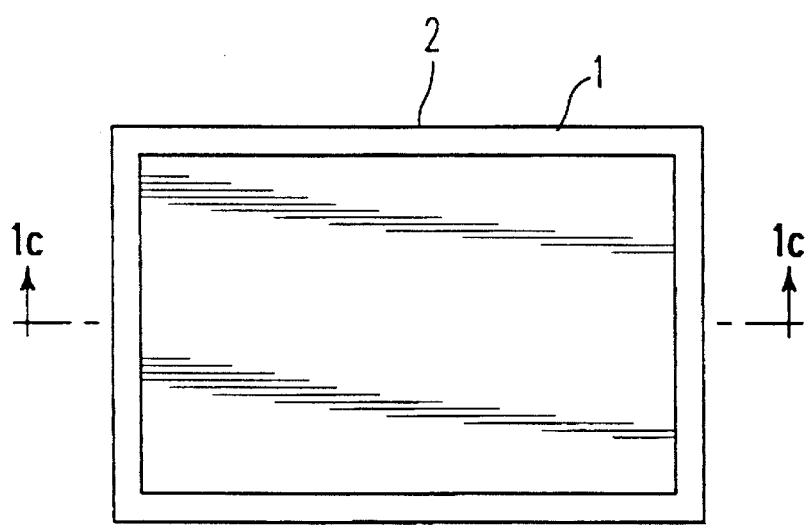
FIG. 1(b) is a plan view of a synthetic resin composite.
Figure 1C:
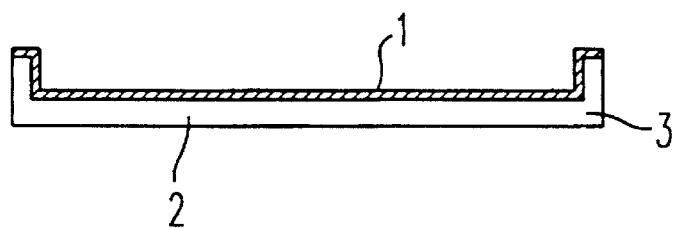
FIG. 1(c) is a cross-sectional view of the synthetic resin composite taken along line A–A' of FIG. 1(b).

Using this thermoplastic resin composition, the following evaluation of the vacuum forming property was carried out. The thermoplastic resin composition was applied to a single screw extruder equipped with a T-die, melted at 220° C. and formed into a flat plate having an average wall thickness of 1 mm. The obtained flat plate was preliminarily dried and then shaped by a plug-assisted pressure-vacuum forming machine while controlling the surface temperature of the flat plate at about 160° C., to obtain a shaped product of the thermoplastic resin composition of a box shape without covering, as shown in FIG. 1. The wall thickness of the shaped product was uniform as visually observed.

The above vacuum-shaped product was assembled with a shaped product of steel of a box shape without covering, as shown in FIG. 1, and in the space defined by the two shaped products, a mixture comprising 110 parts of toluene diisocyanate, 100 parts of an adduct of methyl glycoxide with propylene oxide (hydroxyl equivalent: 110), 30 parts of Freon 141b, 3.5 parts of water, 0.4 part of di-n-octyltin laurate and 0.2 part of tetramethylguanidine, was injected and reacted at 50° C. for 30 minutes, to obtain a synthetic resin composite.

Then, using this synthetic resin composite, a thermal cycle test was conducted. Namely, the obtained synthetic resin composite was placed in a constant temperature chamber, and a thermal cycle of −10° C. for 3 hours and 40° C. for 3 hours, was repeated twice. From the synthetic resin composite after the thermal cycle test, the shaped product of the thermoplastic resin composition was taken out, and the appearance was inspected, whereby no crack or the like was observed.

The size of the synthetic resin composite in FIG. 1 was 175 mm in width×256 mm in length×30 mm in height, and the thickness of the urethane foam was 5 mm.

EXAMPLES 23 to 40

Component (A) and polymer mixture (D) were melt-mixed in the proportions as identified in Table 11 at 230° C. by a twin screw extruder to obtain a thermoplastic resin composition. Each thermoplastic resin composition thus prepared was subjected to the evaluation of the vacuum-forming property and the thermal cycle test in the same manner as in Example 22. The results are shown in Table 11 together with the compositional proportions of the thermoplastic resin composition.

The vacuum forming property was evaluated by visually inspecting the wall thickness after the vacuum forming to see if it was uniform or not. ο indicates "uniform", Δ "slight non-uniform", and ×"non-uniform". Further, the evaluation of the thermal cycle test was conducted in such a manner that from the synthetic resin composite after the test, the shaped product of the thermoplastic resin composition was taken out, and the appearance was visually inspected and evaluated under such standards that ο indicates excellent appearance without cracking, whitening or the like, and × indicates that cracking or whitening was observed.

EXAMPLE 41

A mixture comprising 100 parts of A-1 as component (A), 9 parts of B-2 as component (B) and 6 parts of C-1 as component (C), was melt-mixed at 230° C. by a twin screw extruder to obtain a thermoplastic resin composition. The thermoplastic resin composition was subjected to the evaluation of the vacuum forming property and the thermal cycle test in the same manner as in Example 22. The wall thickness of the shaped product of the thermoplastic resin composition of a box shape without covering, was uniform, and no cracking was observed in the shaped product of the thermoplastic resin composition in the thermal cycle test.

EXAMPLE 42

A mixture comprising 100 parts of A-3 as component (A), 9 parts of B-2 as component (B) and 6 parts of C-1 as component (C), was melt-mixed at 230° C. by a twin screw extruder to obtain a thermoplastic resin composition. The thermoplastic resin composition was subjected to the evaluation of the vacuum forming property and the thermal cycle test in the same manner as in Example 22. The wall thickness of the shaped product of the thermoplastic resin composition of a box shape without covering, was uniform, and no cracking was observed in the shaped product of the thermoplastic resin composition in the thermal cycle test.

COMPARATIVE EXAMPLES 9 to 16

Component (A) and component (D) were melt-mixed in the proportions as identified in Table 12 at 230° C. by a twin screw extruder to obtain a thermoplastic resin composition. Each thermoplastic resin composition was evaluated in the same manner as in Example 22. The results are shown in Table 12 together with the compositional proportions of the thermoplastic resin composition.

TABLE 11

Results of evaluation of the synthetic resin composite

|  | Component (A) (wt %) |  | Polymer mixture (D) (wt %) |  | Vacuum forming property (wall thickness) | Thermal cycle test |
|---|---|---|---|---|---|---|
| Example 22 | A-1 | 100 | D-2 | 5 | ○ | ○ |
| Example 23 | A-1 | 100 | D-2 | 15 | ○ | ○ |
| Example 24 | A-1 | 100 | D-2 | 30 | ○ | ○ |
| Example 25 | A-1 | 100 | D-2 | 45 | ○ | ○ |
| Example 26 | A-1 | 100 | D-1 | 15 | ○ | ○ |
| Example 27 | A-2 | 100 | D-2 | 15 | ○ | ○ |
| Example 28 | A-3 | 100 | D-2 | 15 | ○ | ○ |
| Example 29 | A-4 | 100 | D-2 | 15 | ○ | ○ |
| Example 30 | A-1 | 100 | D-3 | 15 | ○ | ○ |
| Example 31 | A-1 | 100 | D-4 | 15 | ○ | ○ |
| Example 32 | A-1 | 100 | D-5 | 15 | ○ | ○ |
| Example 33 | A-1 | 100 | D-6 | 15 | ○ | ○ |
| Example 34 | A-1 | 100 | D-7 | 15 | ○ | ○ |
| Example 35 | A-1 | 100 | D-8 | 15 | ○ | ○ |
| Example 36 | A-1 | 100 | D-9 | 15 | ○ | ○ |
| Example 37 | A-1 | 100 | D-10 | 15 | Δ | ○ |
| Example 38 | A-1 | 100 | D-11 | 15 | Δ | ○ |
| Example 39 | A-1 | 100 | D-1 | 45 | ○ | ○ |
| Example 40 | A-1 | 100 | D-4 | 45 | ○ | ○ |

TABLE 12

Results of evaluation of the synthetic resin composite

|  | Component (A) (wt %) |  | Polymer mixture (D) (wt %) |  | Vacuum forming property (wall thickness) | Thermal cycle test |
|---|---|---|---|---|---|---|
| Comparative Example 9 | A-1 | 100 |  | 0 | Δ | × |
| Comparative Example 10 | A-1 | 100 | D-12 | 15 | ○ | × |
| Comparative Example 11 | A-1 | 100 | D-13 | 15 | × | × |
| Comparative Example 12 | A-1 | 100 | D-14 | 15 | ○ | × |
| Comparative Example 13 | A-1 | 100 | D-15 | 15 | ○ | × |
| Comparative Example 14 | A-1 | 100 | D-16 | 15 | ○ | × |
| Comparative Example 15 | A-1 | 100 | D-2 | 65 | × | ○ |
| Comparative Example 16 | A-3 | 100 | D-14 | 15 | ○ | × |

As described in the foregoing, the thermoplastic resin composition comprising the diene rubber-containing styrene resin, the vinyl resin-containing acrylic rubber polymer and the polymer of a vinyl monomer having a weight average molecular weight of at least 200,000, has excellent and balanced impact strength and Freon resistance and is excellent in the vacuum forming property, and the synthetic resin composite consisting essentially of a shaped product of this thermoplastic resin composition and a urethane foam, is useful for e.g. heat-insulating materials, vibration-preventing materials and sound-shielding materials, since formation of cracks can be prevented even under a severe environment of e.g. thermal cycle.

What is claimed is:

1. A theromplastic resin composition, comprising:
   A) 100 parts by weight of a grafted diene rubber-containing styrene resin wherein said styrene resin contains aromatic vinyl monomer units and vinyl cyanide monomer units,
   B) from 1.5 to 35 by parts by weight of a vinyl resin-containing acrylic rubber polymer having a glass transition temperature of not higher than 20° C. and a gel content of not higher than 70%, obtained by polymerizing from 1 to 200 parts by weight of at least one vinyl monomer in the presence of 100 parts by weight of an acrylic rubber polymer, and
   C) from 1.8 to 37.5 parts by weight of a polymer of a vinyl monomer having a weight average molecular weight of at least 200,000 and a glass transition temperature exceeding 20° C., provided that the sum of components (B) and (C) is from 6 to 50 by weight.

2. The thermoplastic resin composition according to claim 1, wherein for component (A) the vinyl cyanide monomer units are present in the amount of 25 to 45 weight %.

3. The thermoplastic resin composition according to claim 1, wherein the diene rubber-containing styrene resin is an ABS resin, a heat-resistant ABS resin, an AES resin or a MBAS resin.

4. The thermoplastic resin composition according to claim 1, wherein the polymer of a vinyl monomer of component (C) is a copolymer of styrene and acrylonitrile or a copolymer of styrene, acrylonitrile and methyl methacrylate.

5. The thermoplastic resin composition according to claim 1, obtained by mixing the diene rubber-containing styrene resin of component (A) to a polymer mixture obtained by mixing an emulsion of the vinyl resin-containing acrylic rubber polymer of component (B) and an emulsion of the polymer of a vinyl monomer of component (C), followed by separation.

6. A process for producing the thermoplastic resin composition as defined in claim 5, which comprises mixing an emulsion of the vinyl resin-containing acrylic rubber polymer of component (B) and an emulsion of the polymer of a vinyl monomer of component (C), followed by separation to obtain a polymer mixture, and mixing the diene rubber-containing styrene resin of component (A) to the polymer mixture.

7. A synthetic resin-composite consisting essentially of a shaped product of the thermoplastic resin composition as defined in claim 1 and a urethane foam.

8. A heat-insulating steel plate-synthetic resin laminate comprising the synthetic resin composite as defined in claim 7 and a steel plate.

9. The thermoplastic resin composition according to claim 1, wherein said styrene resin contains 20–50 wt. % of vinyl cyanide monomer units.

10. The thermoplastic resin composition of claim 1, wherein said styrene resin contains 20–34 wt. % of said vinyl cyanide monomer units.

11. The thermoplastic resin composition of claim 1, wherein said acrylic rubber polymer has a glass transition temperature not higher than 10° C.

12. The thermoplastic resin composition of claim 1, wherein said acrylic rubber polymer has a gel content not higher than 50%.

13. The thermoplastic resin composition of claim 1, wherein said vinyl resin-containing acrylic rubber polymer is obtained by polymerizing 50–160 parts by weight of said vinyl monomer in the presence of 100 parts by weight of said acrylic rubber polymer.

14. The thermoplastic resin composition of claim 1, wherein said polymer of a vinyl monomer in component (C) has a glass transition temperature of at least 30° C.

15. The thermoplastic resin composition of claim 1, wherein said polymer of a vinyl monomer of component (C) has a weight average molecular weight of at least 300,000.

16. The thermoplastic resin composition of claim 1, comprising 100 parts by weight of component (A), 1.5–35 parts by weight of component (B), and 1.8–37.5 parts by weight of component (C), provided that the sum of components (B) and (C) is from 6–50 parts by weight.

* * * * *

UNITED STATES PATENT AND TRADEMARK OFFICE
CERTIFICATE OF CORRECTION

PATENT NO. : 5,554,688
DATED : September 10, 1996
INVENTOR(S) : Hiroyuki YASHIMA, et al.

It is certified that error appears in the above-identified patent and that said Letters Patent is hereby corrected as shown below:

On the title page, item [21], line 10, "Appl. No.: 610,754" should read --Appl. No.: 510,754--.

Signed and Sealed this

Seventeenth Day of February, 1998

*Attest:*

BRUCE LEHMAN

*Attesting Officer*       *Commissioner of Patents and Trademarks*